United States Patent
Kuhn

(10) Patent No.: US 10,436,175 B2
(45) Date of Patent: Oct. 8, 2019

(54) METHOD FOR ATTACHING A TOOTHED REAR EDGE TO A BLADE REAR EDGE OF A ROTOR BLADE

(71) Applicant: WOBBEN PROPERTIES GMBH, Aurich (DE)

(72) Inventor: Marvin Kuhn, Rastede (DE)

(73) Assignee: Wobben Properties GmbH, Aurich (DE)

( * ) Notice: Subject to any disclaimer, the term of this patent is extended or adjusted under 35 U.S.C. 154(b) by 357 days.

(21) Appl. No.: 15/300,752

(22) PCT Filed: Mar. 31, 2015

(86) PCT No.: PCT/EP2015/056968
§ 371 (c)(1),
(2) Date: Sep. 29, 2016

(87) PCT Pub. No.: WO2015/150358
PCT Pub. Date: Oct. 8, 2015

(65) Prior Publication Data
US 2017/0016426 A1    Jan. 19, 2017

(30) Foreign Application Priority Data

Apr. 2, 2014 (DE) .......................... 10 2014 206 345

(51) Int. Cl.
*F03D 1/06* (2006.01)
*F03D 1/00* (2006.01)
(Continued)

(52) U.S. Cl.
CPC .......... *F03D 1/0675* (2013.01); *F03D 13/10* (2016.05); *F03D 80/30* (2016.05);
(Continued)

(58) Field of Classification Search
CPC .......... F03D 1/00; F03D 1/0675; F03D 13/10; F03D 80/30; F05B 2230/23;
(Continued)

(56) References Cited

U.S. PATENT DOCUMENTS 6,398,502 B1    6/2002 Wobben
7,909,576 B1    3/2011 van der Bos et al.
(Continued)

FOREIGN PATENT DOCUMENTS

DE            19743694 A1    4/1999
DE        102008007908 A1    8/2008
(Continued)

*Primary Examiner* — Igor Kershteyn
(74) *Attorney, Agent, or Firm* — Seed Intellectual Property Law Group LLP

(57) ABSTRACT

A method for applying a serrated rear edge to a blade rear edge of a rotor blade of a wind turbine that has a pressure side and a suction side. The method comprises the steps: disposing the serrated rear edge, with an attaching portion, on a surface of the blade rear edge, and attaching the serrated rear edge, in the region of the attaching portion, to the rotor blade by means of adhesive, the serrated rear edge being disposed on the suction side and being additionally fixed by application of an overlapping material strip to the pressure side, and the material strip being disposed on the pressure side and on the serrated rear edge such that it overlaps a transition between the blade rear edge and the serrated rear edge, or the serrated rear edge being disposed on the pressure side and additionally fixed by application of an overlapping material strip to the suction side, and the material strip being disposed on the suction side and on the serrated rear edge such that it overlaps a transition between the blade rear edge and the serrated rear edge.

8 Claims, 3 Drawing Sheets

(51) Int. Cl.
*F03D 80/30* (2016.01)
*F03D 13/10* (2016.01)

(52) U.S. Cl.
CPC ....... *F05B 2230/23* (2013.01); *F05B 2230/60* (2013.01); *F05B 2240/30* (2013.01); *F05B 2260/30* (2013.01); *F05B 2260/96* (2013.01); *Y02E 10/721* (2013.01); *Y02P 70/523* (2015.11)

(58) Field of Classification Search
CPC .............. F05B 2230/60; F05B 2240/30; F05B 2260/30; F05B 2260/96; Y02P 70/523; Y02E 10/721
See application file for complete search history.

(56) References Cited

U.S. PATENT DOCUMENTS

| | | | |
|---|---|---|---|
| 7,918,653 B2 | 4/2011 | Standish et al. | |
| 8,083,488 B2 | 12/2011 | Fritz | |
| 8,506,250 B2 | 8/2013 | Bagepalli et al. | |
| 2008/0187442 A1* | 8/2008 | Standish | F03D 1/065 416/235 |
| 2011/0142635 A1* | 6/2011 | Fritz | F03D 1/0675 416/62 |
| 2012/0134817 A1* | 5/2012 | Bagepalli | F03D 1/0675 416/62 |
| 2012/0141277 A1 | 6/2012 | Yarbrough et al. | |
| 2013/0323070 A1 | 12/2013 | Grabau | |
| 2014/0072440 A1* | 3/2014 | Jacobsen | F03D 1/06 416/241 R |

FOREIGN PATENT DOCUMENTS

| | | |
|---|---|---|
| DE | 102011051329 A1 | 12/2011 |
| DE | 102011052930 A1 | 2/2012 |
| DE | 102012109989 A1 | 4/2013 |
| EP | 2667019 A2 | 11/2013 |
| WO | 2014048437 A1 | 4/2014 |

* cited by examiner

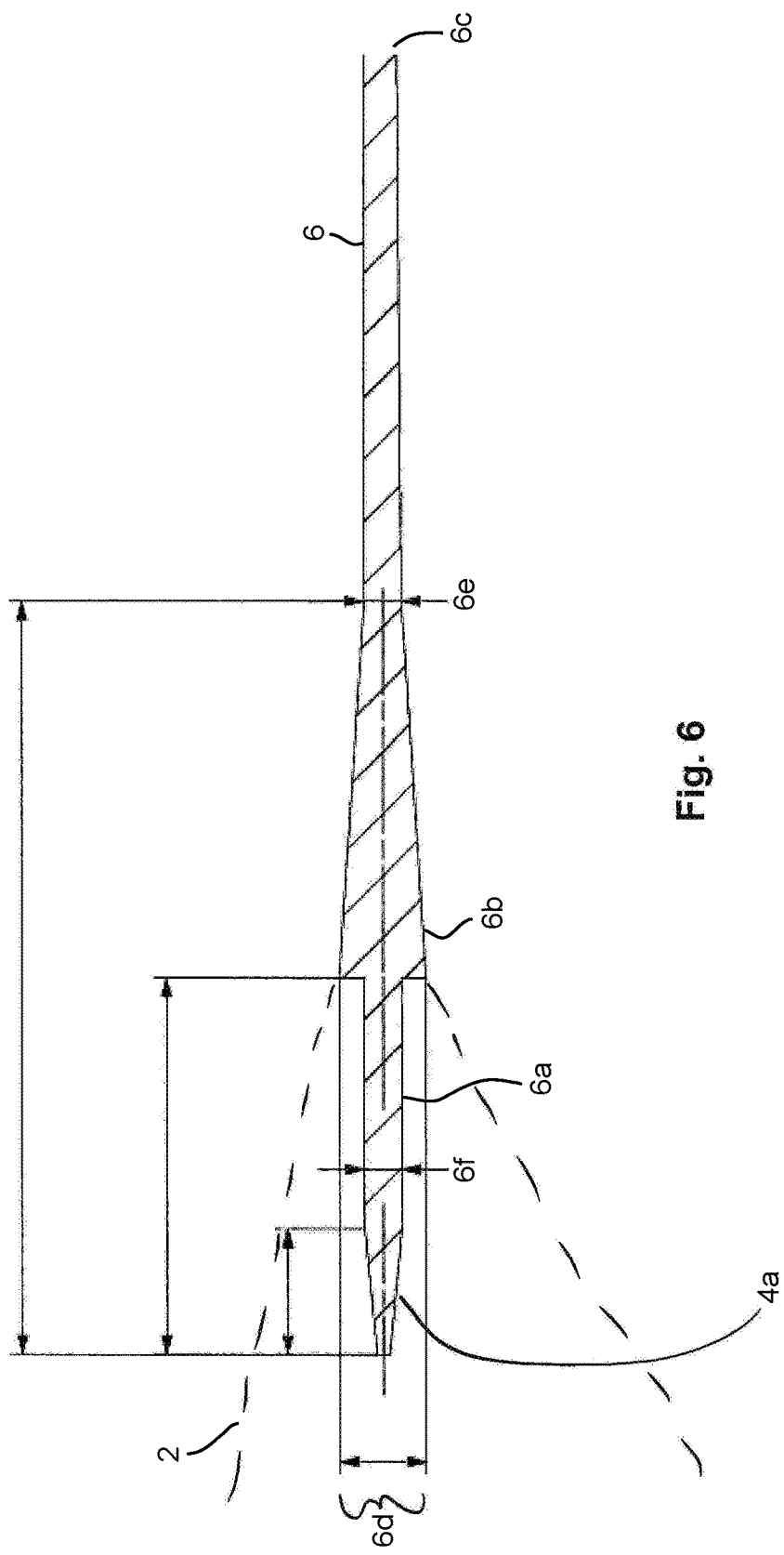

METHOD FOR ATTACHING A TOOTHED REAR EDGE TO A BLADE REAR EDGE OF A ROTOR BLADE

BACKGROUND

Technical Field

The present invention relates to a method for applying a serrated rear edge to a blade rear edge of a rotor blade. The present invention additionally relates to such a serrated rear edge, and to a rotor blade having such a serrated rear edge. The invention also relates to a wind turbine having at least one rotor blade having a serrated rear edge.

Description of the Related Art

Serrated rear edges of rotor blades of wind turbines, especially so-called horizontal-axis wind turbines, are known. They are disposed at the blade rear edge of the rotor blade, at least in a portion, and then constitute there, essentially, the new rear edge of the rotor blade. This new rear edge, i.e., this serrated rear edge, thus creates a serrated contour, in particular having long, pointed serrations, which influences the aerodynamic behavior in this region. For such serrated rear edges, the term "serrations" is also generally used.

It has been found that such serrations can have a positive effect on the aerodynamic behavior of the rotor blades, such that nowadays rotor blades are increasingly being constructed with such serrations. For older wind turbines, it is desirable to retrofit such serrations. In the case of rotor blades that, in the region of their rear edge, have a cavity extending along the rear edge, this cavity can be sawn open, and such a serrated rear edge can be inserted in the resultant opening. Another possibility consists in providing the serrated rear edge as an approximately V-shaped profile, in order to attach it, with the V-shaped opening, on the previously existing rear edge of the rotor blade. For this purpose, this existing rear edge would have to be milled appropriately on the pressure and the suction side in order to create a match to this profile. For example, FIG. 1 of the German patent application DE 197 43 694 A1 discloses such a V-shaped profile, although not for a serrated rear edge, but for a rear edge without serrations.

If the described preconditions, such as the longitudinally extending cavity, are not present, or if the resource input for retrofitting such a serrated rear edge is to be kept at a low level, especially for reasons of cost and time, the methods for retrofitting that are described above may be disadvantageous.

The German Patent and Trade Mark Office, in the priority application relating to the present PCT application, has searched the following prior art: DE 197 43 694 A1, DE 10 2008 007 908 A1, DE 10 2011 052 930 A1, DE 10 2012 109 989 A1, EP 2 667 019 A2 and WO 2014/048 437 A1.

BRIEF SUMMARY

Proposed according to the invention is a method for applying a serrated rear edge on a rotor blade. In particular, the serrated rear edge, which has an attaching portion and, obviously, also a serrated portion, is used as a mountable serrated rear edge. The attaching portion also constitutes, essentially, a common basis, or a part of a common basis, via which the individual serrations are connected to each other.

By means of this attaching portion, the serrated rear edge, i.e., this component, is then attached to the surface of the blade rear edge. The serrated rear edge is attached to the rotor blade, in the region of this attaching portion, by means of adhesive. To that extent, the serrated rear edge can be disposed and attached in a simple manner.

The serrated rear edge in this case is disposed and attached on the suction side of the rotor blade. Supplementary to this, an overlapping material strip is disposed on the pressure side, in order thereby to effect additional fixing of the serrated rear edge. This material strip is disposed on the pressure side and in relation to the serrated rear edge such that it overlaps the transition between the blade rear edge and the serrated rear edge. The blade rear edge in this case is the previously existing rear edge, i.e., the rear edge before the serrated rear edge was mounted. Owing to this overlap, a firm connection is effected, not only between the serrated rear edge and the suction side, but also between the serrated rear edge and the pressure side. This overlapping material strip thus provides additional stabilization, and this material strip, together with the serrated rear edge, forms essentially a V-shaped structure. This V-shaped structure then acts essentially as if mounted on the blade rear edge from behind.

Alternatively, the serrated rear edge may also be mounted on the pressure side, and correspondingly fixed further on the suction side by means of the material strip, as described above in relation to the pressure side. Mostly, however, the serrated rear edge is better suited to the flow conditions of the blade if it is disposed on the suction side and, in particular, substantially lengthens the surface of the suction side rearwards.

Preferably, the serrated rear edge is attached to the blade surface of the blade rear edge by means of double-sided adhesive tape. The adhesive bond between the serrated rear edge and the blade surface is thus easily achievable by the placement of double-sided adhesive tape. It was identified in this case that the use of a double-sided adhesive tape can provide the desired stability. On the one hand, it was identified that the blade surface and the surface of the attaching portion of the serrated rear edge are very even and flat in form, and also in totality provide a large surface area. Owing to this large surface area, the use of the double-sided adhesive tape makes it possible to achieve an overall strong adhesion. In addition, because of the use of a double-sided adhesive tape, an adhesive layer of uniform thickness is provided. This also takes account of the identified fact that two large, even surfaces are bonded together in this case.

Preferably, the material strip is dimensionally stable, in particular realized as a plastic profile. In this case, it can be matched to the shape of the transition region between the rotor blade and the serrated rear edge. The result is that, not only is the serrated rear edge fixed with improved attachment to the rotor blade, but the serrated rear edge is also stabilized. This can also positively affect the avoidance of vibrations.

It is proposed, according to an embodiment, that the material strip be stuck on by means of adhesive, in particular double-sided adhesive tape, overlapping the transition between the blade rear edge and the serrated rear edge. Here, basically, the material strip is applied to this transition region and bonded both to the blade rear edge and to the serrated rear edge. Even if double-sided adhesive tape is used, a double-sided tape can be used here in each case for the respective region, i.e., one for attachment to the blade rear edge and one for attachment to the serrated rear edge. Alternatively, a single double-sided adhesive tape may also be provided. This also includes, if necessary, subdividing the double-sided adhesive tape in its length, e.g., in meter intervals. In this case, the material strip is thus inserted into this transition region with a fit that is as precise as possible. It is to be noted in this case that this transition region between the blade rear edge and the serrated rear edge is basically angular in form. Preferably, this material strip is matched to precisely this angular transition.

Bonding may also be effected by means of filler compound. This filler can be used to fill a part of the transition, and the filler can also function as a compensating compound when the material strip is being applied. Moreover, compound can also be applied in the region of the edges of the material strip, in order to compensate a shoulder there, even if small, i.e., the transition from the material strip to the corresponding surface of the rotor blade, or of the serrated rear edge.

As an alternative or in addition to the use of filler compound, a permanently elastic PU sealing compound (e.g., Terostat MS 930) may be used. The permanently elastic PU sealing compound can be used in exactly the same way as the filler compound described above.

Preferably, the attachment of the material strip to the rotor blade differs from the attachment of the material strip to the serrated rear edge. The difference may consist especially in that differing adhesives are used. This also includes differing filler compounds or resins (or permanently elastic PU sealing mass), which likewise act as adhesives here. Differing double-sided adhesive tapes may also be used or, for example, a double-sided adhesive tape is used only for respectively one of the two regions. This enables the adhesive bond to be matched to the material of the rotor blade, or rear edge. It also makes it possible, for example, for a particularly strong adhesive bond to be selected for the adhesive bond to the serrated rear edge, such that, de facto, the serrated rear edge, together with the material strip, constitutes a dimensionally stable unit.

It is proposed, according to an embodiment, that, before the serrated rear edge is disposed with its attaching portion on the surface of the rotor blade, i.e., on the suction side or, in the alternative case, on the pressure side, a shoulder be made there in the surface. Such a shoulder may be milled-in, for example, and the serrated rear edge may be bonded-in there. In addition or as an alternative to the milling of the shoulder, the shoulder may be achieved, for example, by an offset in the mold in the production of the rotor blade. This would have the advantage that milling is no longer required. As a result, a shoulder between the serrated rear edge and the surface can be reduced, or even avoided entirely. The milling-in of such a shoulder is comparatively complicated, in any case for retrofitting, but may nevertheless be advantageous because of the effect that can be achieved; in particular, the work required for this is justifiable. Nevertheless, the total amount of work required for this is comparatively small, because only one shoulder is provided, i.e., milling-in has to be performed only on one side.

Preferably, an acrylate adhesive is used for the adhesive or the double-sided adhesive tape. This applies both to the direct attachment between the serrated rear edge and the blade rear edge, and to the attachment of the material strip to the rotor blade, or to the serrated rear edge. Consequently, an adhesive that is comparatively easily obtainable can be used, and it is possible to draw upon experience gained in the handling of such an adhesive. This adhesive is well suited to use on rotor blades, especially if the latter are made from fiber composite material, such as glass-fiber composite material, and empirical values of its durability are available.

As an alternative to an acrylate adhesive, polyurethane or epoxy adhesives may be used (such as, for example, adhesive resin type g, S 25, V10). Moreover, a laminating resin may likewise be used as an adhesive.

Additionally proposed according to the invention is a rotor blade, which has a serrated rear edge that, according to a method of at least one of the embodiments described above, is disposed on the rotor blade. Additionally or alternatively, the rotor blade has a serrated rear edge that constitutes at least a part of a lightning protection system. Such a serrated rear edge can thus perform a dual function, namely, to improve the flow characteristics of the rotor blade and, in addition, to provide a part of a lightning protection, or to complement a lightning protection system, or to enhance a lightning protection system, especially if the previous lightning protection system had already incurred a lighting strike. Preferably proposed is a serrated rear edge that is made entirely or partially of metal and that, additionally or alternatively, has an electric line to conduct electric current in the event of a lightning strike. In this way, the serrated rear edge can be made suitable as lightning protection or part of a lightning protection.

According to an embodiment, the serrated rear edge is prepared for the purpose of diverting an electric current in the event of a lightning strike. For this purpose, there is an electrical connection from the serrated rear edge to a prepared lightning strike point in the rotor blade. Such a lightning strike point may be, in particular, a metallic tip of the rotor blade. However, other strike points may be provided on the rotor blade, and electrically connected to the serrated rear edge.

Additionally or alternatively, an electrical connection from the serrated rear edge to a blade root region of the rotor blade is proposed, in order to transmit the electric current via this connection in the event of lightning strike, so as to conduct it ultimately to earth. Means are then provided, out from the root region of the rotor blade, to transmit the current also via the rotating connections (blade pitch control, generator and yaw control).

Also proposed according to the invention is a serrated rear edge, which is prepared to constitute a part of a lightning protection. For this purpose, the serrated rear edge is realized as described above in connection with the lightning protection in the corresponding embodiments of the rotor blade. In particular, the serrated rear edge is made entirely or partially of metal and, additionally or alternatively, has an electric line for conducting electric current in the event of a lightning strike.

Additionally proposed according to the invention is a wind turbine, which has at least one rotor blade according to at least one of the above embodiments, and which, additionally or alternatively, has a serrated rear edge according to one of the described embodiments.

BRIEF DESCRIPTION OF THE SEVERAL VIEWS OF THE DRAWINGS

The invention is explained exemplarily in greater detail in the following on the basis of embodiments and with reference to the accompanying figures.

FIG. 6 shows a schematic sectional view of a serrated rear edge according to the invention.

DETAILED DESCRIPTION

Figure 1:
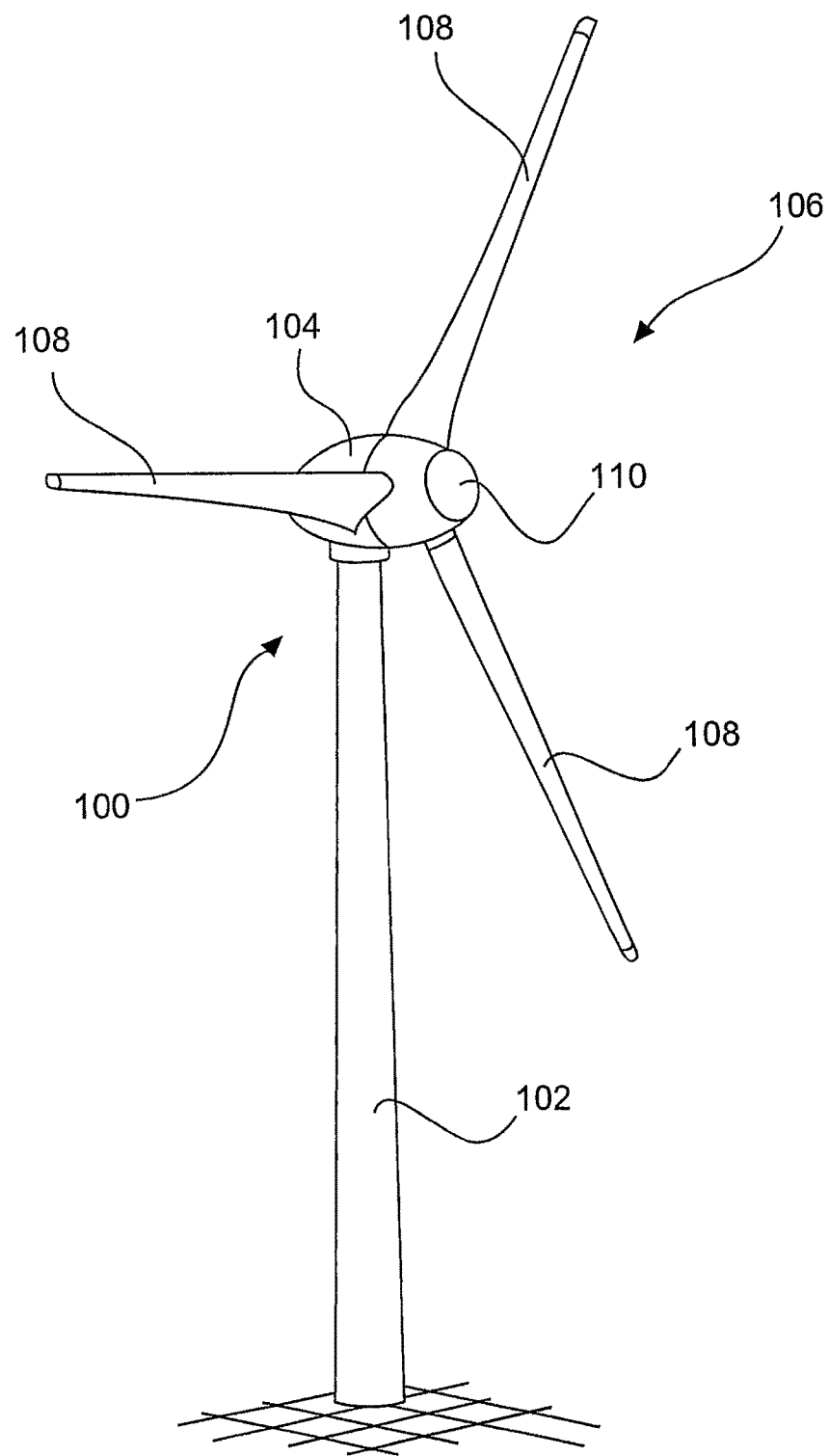
FIG. 1 shows a wind turbine, in a perspective representation.

FIG. 1 shows a wind turbine 100, having a tower 102 and a nacelle 104. A rotor 106, having three rotor blades 108 and a spinner 110, is disposed on the nacelle 104. When in operation, the rotor 106 is put into a rotary motion by the wind, and thereby drives a generator in the nacelle 104.

Figure 2:
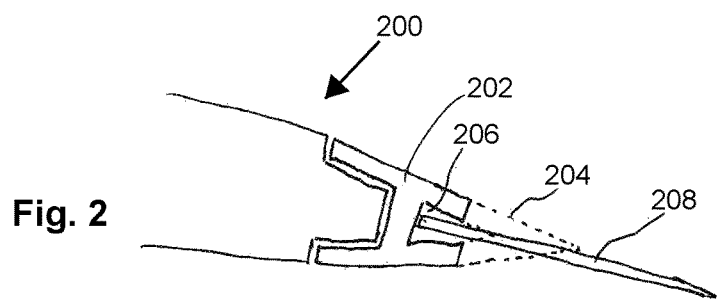
FIG. 2 shows a possibility for retrofitting a serrated rear edge on a rotor blade, in a schematic, lateral sectional view.
Figure 3:
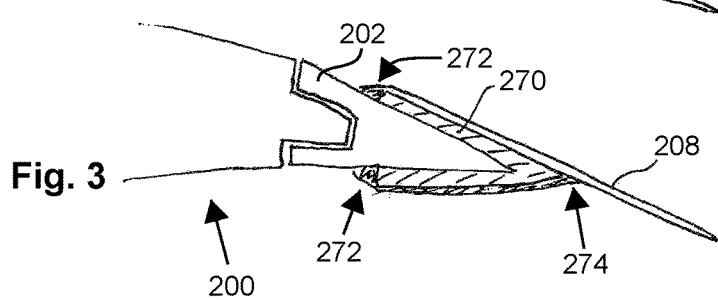
FIG. 3 shows a further possibility for retrofitting a serrated rear edge on a rotor blade, in a schematic sectional view.
Figure 4:
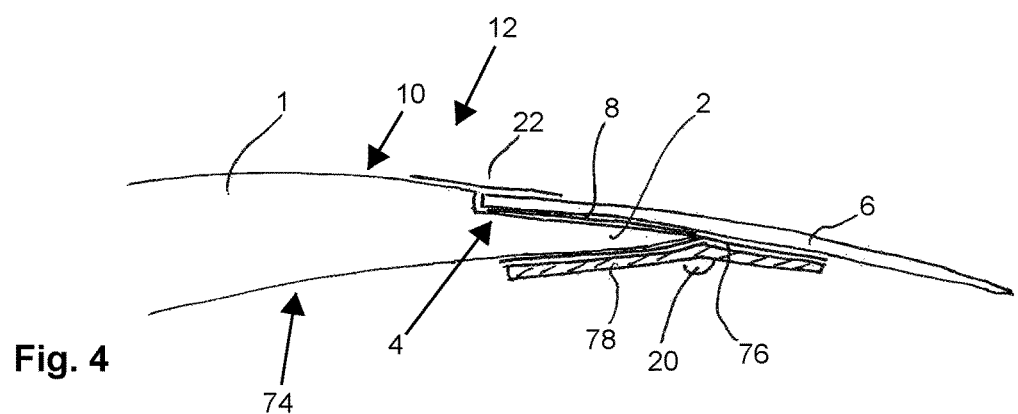
FIG. 4 shows a serrated rear edge retrofitted according to the invention, in a schematic, lateral sectional view.

FIG. 2 shows a rear part of a rotor blade 200, having a mounted-on rear edge 202. FIG. 2 and, additionally, also FIGS. 3 and 4 show lateral sectional views, in which, for reasons of greater clarity, not all sectional surfaces are shown with hatching. The rear edge 202 originally tapered to a point, as the broken lines 204 are still intended to indicate. The rear edge 202 also had an interior cavity 206. For the purpose of attaching a serrated rear edge 208, the mounted-on edge 202 has been sawn open, such that the cavity 206 was made accessible. The serrated rear edge 208 could thus be inserted in the cavity 206 and attached there.

FIG. 3 shows a variant in which a rear edge 202 without a cavity is mounted on the rotor blade 200. The serrated rear edge 208 therefore cannot be attached by retrofitting as shown in FIG. 2. One possibility consists in using a V-shaped profile 210 as a carrier for the serrated rear edge 208. Alternatively, the serrated rear edge 208 itself may have, constitute or include such a V-shaped profile.

This V-shaped profile 210 enables the serrated rear edge 208 to be mounted on the rear edge 202. In order to avoid an angular shoulder in relation to the rear edge 202, filler compound may be applied there, in the transition 212. Filler compound may also be applied at the transition 214 towards the serrated rear edge 208.

Figure 5:
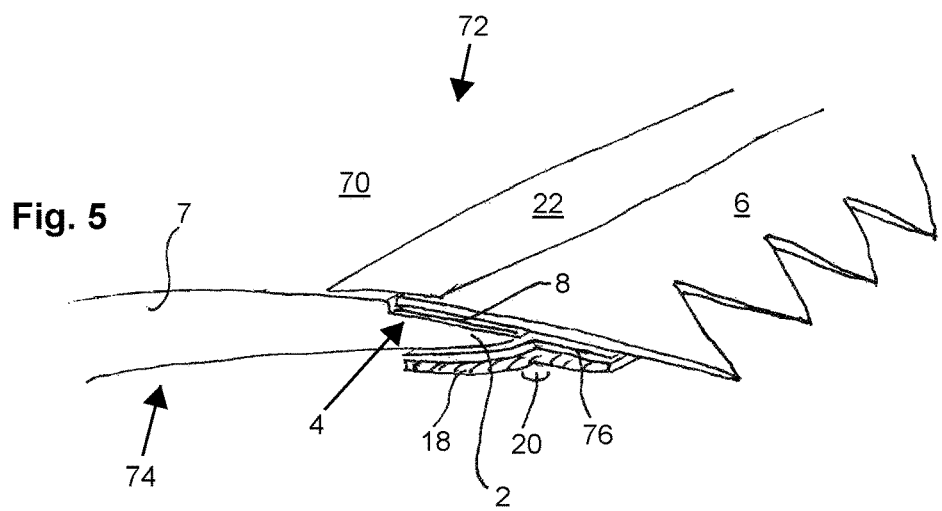
FIG. 5 shows the retrofitted serrated rear edge according to FIG. 4, in a perspective representation.

However, such a type of retrofitting according to FIG. 3 can be complicated, and the solution according to FIG. 4, FIG. 5 and FIG. 6 is proposed according to the invention. On the rotor blade 1, of which only its rear part is represented, the recess 4 is optionally milled-in, as a shoulder, in the region of the rear edge 2, which is also referred to as a blade rear edge. As an alternative to this, the recess, or the shoulder, may be produced by an offset in the mold that is used to produce the rotor blade. The shoulder, or recess, would therefore no longer have to be reworked, or milled. For simplification, and therefore also to speed up the retrofitting method, it is also possible to dispense with this recess 4. The serrated rear edge 6 is then inserted in this recess 4, and fixedly stuck to the first double-sided adhesive tape 8. Without a recess 4, the serrated rear edge 6 could instead be stuck directly on to the surface 10 of the rotor blade 1, this also being proposed at least according to one embodiment. In this shown embodiment of FIG. 4 and FIG. 5, the surface 10 is the suction side 12 of the rotor blade 1 and, accordingly, the pressure side 14 is on the other side of the rotor blade 1.

For further fixing of the serrated rear edge 6 there is then a second double-sided adhesive tape 16. The latter is stuck on to the rotor blade 1, on its pressure side 14, and on to the serrated rear edge 6, so as to overlap. To effect further fixing and stabilizing, the material strip 18 is provided, which is basically stuck on to the second double-sided adhesive tape 16, and which thus also connects the pressure side 14 of the rotor blade 1 and the serrated rear edge 6 on the same side. The material strip 18 and the second double-sided adhesive tape 16 may also be realized as a common element, e.g., as a correspondingly reinforced adhesive strip.

FIG. 6 shows a schematic sectional view of a serrated rear edge according to the invention. The serrated rear edge 6 has a first end 6a and a second end 6c. The serrations are provided in the region of the second end 6c. The first end 6a serves to be attached in or at the rear edge of the rotor blade. In its central region and towards the second end 2c, the serrated rear edge 6 has a first thickness 6e. The serrated rear edge 6 additionally has a thickened portion 6b at a rear-edge ridge. The thickened portion 6b has a second thickness 6d, which is greater than the first thickness 6e. Towards the first end 6a, i.e., towards that end which is attached in or at the rear edge of the rotor blade, a shoulder is optionally provided, such that the thickness 6f of the first end 6a of the serrated rear edge 6 is less than the second thickness 6d. The serrated rear edge may taper towards the first end 6a. Optionally, the first end 6a may be inserted in a recess 4a in a rear edge 2 of the rotor blade, up to the point at which the shoulder is provided. In the rear edge 2, a recess 4a may be provided, in which the first end 6a of the serrated rear edge 6 can be inserted, in order to be attached there. This can be effected by adhesive bonding, as already described above.

The serrated rear edge may optionally be designed as part of a lightning protection system of the rotor blade. For this purpose, the serrated rear edge may be made entirely or partially of metal, and/or may have an electric line for conducting electric current in the event of a lightning strike.

Preferably, as represented, the material strip 18 is a rigid profile, which has the shown angle 20 as a rigid angle. Moreover, the material strip 18, with the second double-sided adhesive tape 16, may replace, or partially replace, lamination at this location.

As a supplementary measure, FIG. 4 and FIG. 5 show a supporting adhesive strip 22, which can achieve additional fixing. This adhesive strip 22, likewise, may replace, or at least partially replace, lamination at this location. Preferably, this adhesive strip 22 is also provided at the location if no recess 4 is provided and, instead, there is a resultant shoulder at the location between the serrated rear edge 6 and the surface 10, which shoulder can be compensated by this supporting adhesive strip 22, thereby at least partially replacing lamination.

The invention claimed is:

1. A method for applying a serrated rear edge to a blade rear edge of a rotor blade of a wind turbine that has a pressure side and a suction side, the method comprising the steps of:

disposing the serrated rear edge, with an attaching portion, on a surface of the blade rear edge, and attaching the serrated rear edge, in a region of the attaching portion, to the rotor blade by adhesive, wherein the serrated rear edge is disposed on the blade rear edge one of the following ways:

the serrated rear edge is disposed on the suction side and fixed by application of an overlapping material strip to the pressure side, wherein the material strip is disposed on the pressure side and on the serrated rear edge such that the material strip overlaps a transition between the blade rear edge and the serrated rear edge; and the serrated rear edge is disposed on the pressure side and fixed by application of an overlapping material strip to the suction side, wherein the material strip is disposed on the suction side and on the serrated rear edge such that the material strip overlaps a transition between the blade rear edge and the serrated rear edge.

2. The method according to claim 1, wherein the serrated rear edge is attached to the blade surface of the blade rear edge by double-sided adhesive tape located between the serrated rear edge and the blade surface.

3. The method according to claim 1, wherein the material strip is dimensionally stable.

4. The method according to claim 1, wherein the material strip is fixed by an adhesive overlapping the transition between the blade rear edge and the serrated rear edge.

5. The method according to claim 4, wherein the adhesive that attaches the material strip to the rotor blade differs from the adhesive that fixes the material strip to the serrated rear edge.

6. The method according claim 1, wherein, before the attachment portion of the serrated rear edge is disposed on the surface, the method includes providing a shoulder in the surface, and wherein disposing the serrated rear edge comprises inserting the attaching portion of the serrated rear edge in the shoulder.

7. The method according to claim 4, wherein at least one of:
- the adhesive that attaches the serrated rear edge to the rotor blade; and
- the adhesive that fixes the material strip in the transition between the blade rear edge and the serrated rear edge,
- includes at least one of an acrylate adhesive, a polyurethane adhesive, an epoxy adhesive, and a laminating resin.

8. The method according to claim 1, wherein the adhesive is double-sided tape or a filler compound.

* * * * *